US012073989B2

(12) United States Patent
Matsumoto

(10) Patent No.: US 12,073,989 B2
(45) Date of Patent: Aug. 27, 2024

(54) METHOD FOR PRODUCING POWDER MAGNETIC CORE AND POWDER MAGNETIC CORE

(71) Applicant: SEIKO EPSON CORPORATION, Tokyo (JP)

(72) Inventor: Yasutaka Matsumoto, Suwa (JP)

(73) Assignee: SEIKO EPSON CORPORATION, Tokyo (JP)

(*) Notice: Subject to any disclaimer, the term of this patent is extended or adjusted under 35 U.S.C. 154(b) by 79 days.

(21) Appl. No.: 17/248,203

(22) Filed: Jan. 14, 2021

(65) Prior Publication Data

US 2021/0213524 A1 Jul. 15, 2021

(30) Foreign Application Priority Data

Jan. 15, 2020 (JP) ................................ 2020-004231

(51) Int. Cl.

| | |
|---|---|
| ***H01F 41/02*** | (2006.01) |
| ***B22F 1/08*** | (2022.01) |
| ***B22F 1/102*** | (2022.01) |
| ***B22F 1/14*** | (2022.01) |
| ***B22F 1/16*** | (2022.01) |
| ***B22F 3/16*** | (2006.01) |
| ***H01F 1/22*** | (2006.01) |

(52) U.S. Cl.

CPC ............ *H01F 41/0246* (2013.01); *B22F 1/08* (2022.01); *B22F 1/102* (2022.01); *B22F 1/14* (2022.01); *B22F 1/16* (2022.01); *B22F 3/16* (2013.01); *H01F 1/22* (2013.01); *B22F 2201/03* (2013.01); *B22F 2202/01* (2013.01); *B22F 2202/11* (2013.01); *B22F 2202/13* (2013.01)

(58) Field of Classification Search

CPC ................ H01F 1/153-15375; H01F 1/20-33

See application file for complete search history.

(56) References Cited

U.S. PATENT DOCUMENTS 5,160,447 A 11/1992 Ishikawa et al.
5,278,384 A 1/1994 Matsuzawa et al.
8,986,839 B2 * 3/2015 Yonetsu .................... H01F 1/24 428/407
2005/0242460 A1 11/2005 Ishihara et al.
(Continued)

FOREIGN PATENT DOCUMENTS

CN 101728049 A * 6/2010
CN 110610803 A * 12/2019 .............. H01F 1/33
(Continued)

OTHER PUBLICATIONS

Bodycote, "Reducing Atmosphere", https://www.bodycote.com/technical-glossary/reducing-atmosphere/; retrieved from internet on Mar. 11, 2023 (Year: 2023).*

*Primary Examiner* — Alexandra M Moore
(74) *Attorney, Agent, or Firm* — Pramod Chintalapoodi

(57) ABSTRACT

A method for producing a powder magnetic core includes applying energy to a surface of a soft magnetic powder coated with an insulator, exposing the soft magnetic powder to an atmosphere having an atmospheric pressure dew point of −30° C. or higher and 15° C. or lower, and forming a molded body by pressing the soft magnetic powder at 20 MPa or more and 400 MPa or less.

6 Claims, 1 Drawing Sheet

(56) References Cited

U.S. PATENT DOCUMENTS

| | | | | |
|---|---|---|---|---|
| 2006/0283525 | A1* | 12/2006 | Toyoda | H01F 1/24 148/105 |
| 2007/0051430 | A1 | 3/2007 | Ishihara et al. | |
| 2010/0271158 | A1* | 10/2010 | Hoshina | C23C 10/46 427/127 |
| 2012/0012777 | A1* | 1/2012 | Sugiyama | H01F 41/0246 427/127 |
| 2012/0049100 | A1* | 3/2012 | Yonetsu | H01F 1/0054 427/127 |
| 2015/0371746 | A1* | 12/2015 | Takashita | H01F 1/26 252/62.55 |
| 2018/0374619 | A1* | 12/2018 | Orimo | H01F 1/38 |
| 2021/0035720 | A1* | 2/2021 | Mori | C22C 38/14 |

FOREIGN PATENT DOCUMENTS

| | | | | | |
|---|---|---|---|---|---|
| JP | S4722514 | U | | 11/1972 | |
| JP | S494197 | A | | 1/1974 | |
| JP | S5014207 | A | | 2/1975 | |
| JP | S6350503 | U | | 4/1988 | |
| JP | 06263548 | A | * | 9/1994 | |
| JP | H08506045 | A | | 7/1996 | |
| JP | 2001196217 | A | | 7/2001 | |
| JP | 2004146804 | A | | 5/2004 | |
| JP | 2006233295 | A | * | 9/2006 | B22F 1/0003 |
| JP | 2006351946 | A | * | 12/2006 | B29C 43/003 |
| JP | 2008262916 | A | | 10/2008 | |
| JP | 2014103267 | A | * | 6/2014 | |
| WO | WO-2011117783 | A2 | * | 9/2011 | B29C 43/003 |
| WO | WO-2021140156 | A1 | * | 7/2021 | B22F 1/0003 |

* cited by examiner

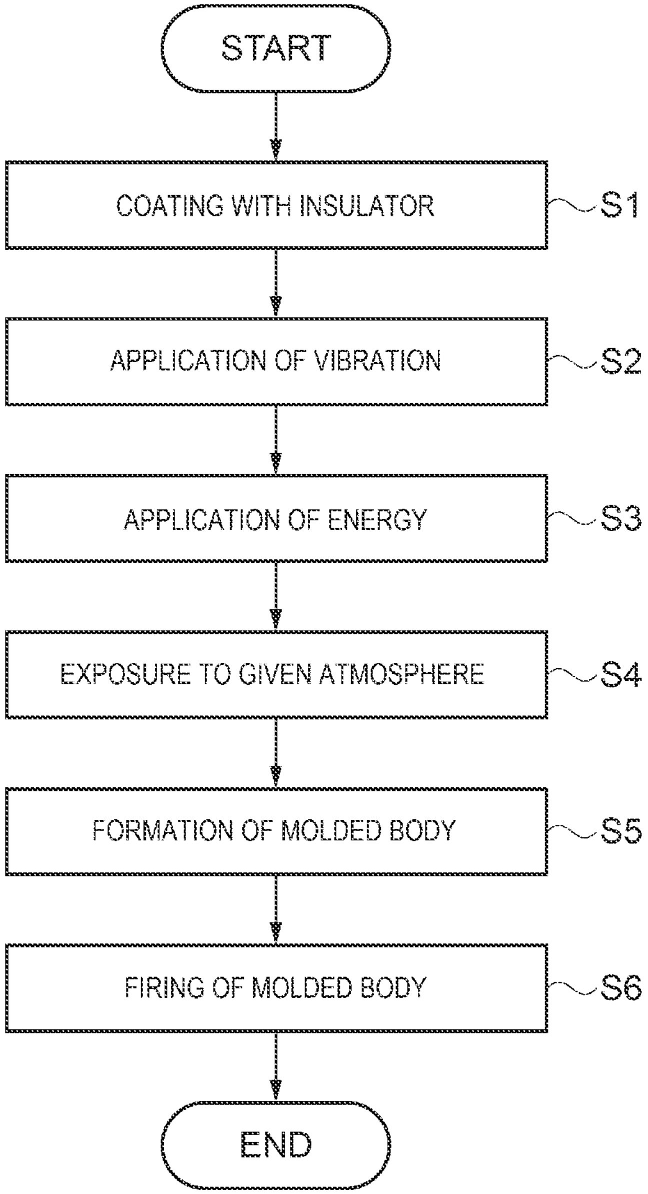
START
COATING WITH INSULATOR
S1
APPLICATION OF VIBRATION
S2
APPLICATION OF ENERGY
S3
EXPOSURE TO GIVEN ATMOSPHERE
S4
FORMATION OF MOLDED BODY
S5
FIRING OF MOLDED BODY
S6
END

METHOD FOR PRODUCING POWDER MAGNETIC CORE AND POWDER MAGNETIC CORE

The present application is based on, and claims priority from JP Application Serial Number 2020-004231, filed on Jan. 15, 2020, the disclosure of which is hereby incorporated by reference herein in its entirety.

BACKGROUND

1. Technical Field

The present disclosure relates to a method for producing a powder magnetic core and a powder magnetic core.

2. Related Art

Heretofore, there has been known a powder magnetic core obtained by compacting a soft magnetic powder. Such a powder magnetic core is adopted for a magnetic core such as an inductor or a toroidal coil. For example, JP-A-2004-146804 (Patent Document 1) discloses a method for producing a powder magnetic core including molding a mixed powder containing an iron powder whose surface is coated with a phosphoric acid compound and a resin powder at a compressive stress of 700 MP to 2000 MPa.

However, the method for producing a powder magnetic core described in Patent Document 1 had a problem that processing distortion occurs in the powder magnetic core due to a high compressive stress during powder compaction, and hysteresis loss is likely to increase. That is, a method for producing a powder magnetic core capable of suppressing the occurrence of processing distortion so as to reduce the hysteresis loss has been demanded.

SUMMARY

A method for producing a powder magnetic core includes applying energy to a surface of a soft magnetic powder coated with an insulator, exposing the soft magnetic powder to an atmosphere having an atmospheric pressure dew point of −30° C. or higher and 15° C. or lower, and forming a molded body by pressing the soft magnetic powder at 20 MPa or more and 400 MPa or less.

A powder magnetic core is produced by the method for producing a powder magnetic core.

BRIEF DESCRIPTION OF THE DRAWINGS

The FIGURE illustrates a process flow diagram showing a method for producing a powder magnetic core according to a first embodiment.

DESCRIPTION OF EXEMPLARY EMBODIMENTS

1. First Embodiment

1.1. Powder Magnetic Core

A powder magnetic core according to a first embodiment is produced by the below-mentioned method for producing a powder magnetic core. The powder magnetic core of this embodiment is applied to a magnetic core such as an inductor. Hereinafter, a soft magnetic powder, an insulator, and the like contained in the powder magnetic core will be described.

1.1.1 Soft Magnetic Powder

The soft magnetic powder is a particle containing a soft magnetic material. Examples of the soft magnetic material include pure iron, various types of Fe-based alloys such as an Fe—Si-based alloy such as silicon steel, an Fe—Ni-based alloy such as permalloy, an Fe—Co-based alloy such as permendur, an Fe—Si—Al-based alloy such as Sendust, an Fe—Cr—Si-based alloy, and an Fe—Cr—Al-based alloy, various types of Ni-based alloys, and various types of Co-based alloys. Among these, various types of Fe-based alloys are preferably used from the viewpoint of magnetic characteristics such as magnetic permeability and magnetic flux density, and productivity such as cost.

As the crystal property of the soft magnetic material, a crystalline form and a non-crystalline (amorphous) form are exemplified. Among these crystal properties, the soft magnetic material preferably contains an amorphous phase as an amorphous form from the viewpoint of reduction in coercive force.

The proportion of the amorphous phase in the soft magnetic material is not particularly limited, but is, for example, preferably 10 vol % or more, more preferably 40 vol % or more. According to this, the hysteresis loss is reduced, and the magnetic permeability and magnetic flux density are improved, and also when the soft magnetic material is compacted, the iron loss is reduced.

Examples of the soft magnetic material capable of forming an amorphous form or a microcrystalline form include Fe-based alloys such as Fe—Si—B-based, Fe—Si—B—C-based, Fe—Si—B—Cr—C-based, Fe—Si—Cr-based, Fe—B-based, Fe—P—C-based, Fe—Co—Si—B-based, Fe—Si—B—Nb-based, and Fe—Zr—B-based alloys, Ni-based alloys such as Ni—Si—B-based and Ni—P—B-based alloys, and Co-based alloys such as Co—Si—B-based alloys. In the soft magnetic powder, multiple types of soft magnetic materials having different crystal properties may be used.

The soft magnetic material is preferably contained in an amount of 50 vol % or more, more preferably 80 vol % or more, further more preferably 90 vol % or more with respect to the packed volume of the soft magnetic powder. According to this, the soft magnetism of the soft magnetic powder is improved. The "packed volume" refers to an actual volume occupied by the soft magnetic powder in a green compact obtained by compacting the soft magnetic powder, and can be measured by a liquid displacement method, a gas displacement method, or the like.

The soft magnetic powder may contain an impurity or an additive other than the soft magnetic material. Examples of the additive include various types of metal materials, various types of non-metal materials, and various types of metal oxide materials.

The average particle diameter of the soft magnetic powder is not particularly limited, but is, for example, 0.25 μm or more and 250.00 μm or less. The average particle diameter as used herein refers to a volume-based particle size distribution (50%). The average particle diameter is measured by a dynamic light scattering method or a laser diffraction method described in JIS Z 8825. Specifically, for example, a particle size distribution meter using a dynamic light scattering method as a measurement principle can be adopted.

A method for producing the soft magnetic powder is not particularly limited, but examples thereof include known production methods such as various atomization methods such as a water atomization method, a gas atomization method, and a spinning water atomization method, a reducing method, a carbonyl method, and a pulverization method. Among these, an atomization method is preferably adopted from the viewpoint that small particles are efficiently produced while suppressing a variation in particle diameter.

1.1.2. Insulator

The insulator coats at least a portion of the surface of the soft magnetic powder, for example, in an island shape. Even if an insulator coating film for the soft magnetic powder is in an island shape, the below-mentioned effect of binding between particles of the soft magnetic powder is exhibited. However, from the viewpoint of enhancing the insulating function by the insulator or the above-mentioned effect, the insulator preferably coats all the surface of the soft magnetic powder.

The film thickness of the insulator is preferably 2 nm or more and 20 nm or less, more preferably 3 nm or more and 5 nm or less from the viewpoint of insulating function. The film thickness of the insulator can be found from the average of the film thickness measured at 5 or more sites by observing the cross section of the insulator-coated soft magnetic powder using a transmission electron microscope or the like.

The volume resistivity of the insulator is $1\times10^{14}$ Ω·cm or more and $1\times10^{17}$ Ω·cm or less. According to this, the DC dielectric strength and magnetic permeability in the insulator-coated soft magnetic powder are improved. For the volume resistivity of the insulator, a known numerical value or a known measurement method can be adopted.

A forming material of the insulator is not particularly limited as long as a hydroxy group is formed by application of energy and a reaction with moisture described below. Specifically, for example, an organosilicon compound such as a polyorganosiloxane compound having a siloxane bond in a main skeleton, and having an alkyl group, an epoxy group, an acrylic group, a polyester group, or the like in a side chain, and an organometallic compound of titanium (Ti), aluminum (Al), hafnium (Hf), copper (Cu), zinc (Zn), tantalum (Ta), chromium (Cr), iron (Fe), nickel (Ni), or the like are exemplified. In the insulator, among these forming materials, one type is used alone or multiple types are used. In this embodiment, the polyorganosiloxane compound is used. When such a polyorganosiloxane compound is used for a coating film, the coating film is relatively flexible, and therefore is likely to fit in the soft magnetic powder.

1.1.3. Another Component

The powder magnetic core may contain, as another component, a binder as needed. As the binder, a known binder such as a resin binder or an inorganic binder is exemplified. Here, in the powder magnetic core of the present disclosure, a hydroxy group or a dangling bond forms a bond between particles of the soft magnetic powder, and therefore, the binder is not used, or the used amount of the binder can be reduced as compared with the related art. The powder magnetic core may contain a known additive or the like other than the binder. The formation of a hydroxy group and a dangling bond and the action thereof will be described later.

In the powder magnetic core of this embodiment, a resin binder is not used. By not using a resin binder, heating for fluidizing the resin binder during powder compaction or for firing and dissipating the resin binder during firing of a compacted molded body is not needed. Therefore, the firing temperature can be lowered as compared with a case where the resin binder is used. Further, an organic substance derived from the resin binder does not remain in the powder magnetic core, and therefore, deterioration over time due to heat of the powder magnetic core can be avoided. In addition, when the soft magnetic powder of the powder magnetic core contains an amorphous phase, crystallization by heat can be suppressed.

The powder magnetic core may contain a known additive, a non-magnetic powder, or the like other than the binder.

1.2. Method for Producing Powder Magnetic Core

A method for producing a powder magnetic core according to a first embodiment will be described with reference to the accompanying FIGURE. As shown in the accompanying FIGURE, the method for producing a powder magnetic core according to this embodiment includes Step S1 to Step s6. The process flow shown in the accompanying FIGURE is an example and is not limited thereto.

In Step S1, first, the surface of the soft magnetic powder may be subjected to a pretreatment so as to remove an adhered substance such as an organic substance or improve the wettability. Examples of the pretreatment include an ozone treatment and a plasma treatment.

Specifically, in the ozone treatment, the soft magnetic powder is exposed to an atmosphere having an ozone concentration of 5000 ppm for 10 minutes or more. In the plasma treatment, a gas such as He (helium), Ar (argon), $N_2$ (nitrogen), $H_2O$ (water), $O_2$ (oxygen), or Ne (neon) is used in an atmospheric pressure plasma or a vacuum plasma.

As an index of the wettability of the surface of the soft magnetic powder, a contact angle of water is used. The contact angle of water after the pretreatment at the surface of the soft magnetic powder is set to 15° or less. According to this, the adhesion of the insulator to the soft magnetic powder is improved. The contact angle of water can be measured by a penetration rate method based on the Lucas-Washburn equation, or the like.

Subsequently, the surface of the soft magnetic powder is coated with the insulator. Examples of a method for forming the insulator coating film for the soft magnetic powder include a sol-gel method, a plasma CVD (Chemical Vapor Deposition) method, and a coating method.

In order to form the above-mentioned polyorganosiloxane compound as the insulator coating film by a sol-gel method, for example, the following method can be adopted. An organosilane, which has 2 or 3 alkoxy groups, and in which the other hydrogen atoms are substituted with an alkyl group, such as dimethoxydimethylsilane or diethoxydimethylsilane is dispersed in an alcohol. Further, in order to substitute the alkoxy group of the organosilane with a hydroxy group, water and a basic compound such as ammonia are added thereto and stirred. Then, the soft magnetic powder is added thereto and stirred, whereby the surface of the soft magnetic powder is coated with the polyorganosiloxane compound. The formed insulator coating film may be subjected to a heating treatment. This heating treatment is performed at a temperature not exceeding the firing temperature in the below-mentioned Step S6.

In order to form the above-mentioned organometallic compound as the insulator coating film, for example, the following method can be adopted. A coating film of a metal oxide is formed by a wet method using a metal alkoxide of the above-mentioned metal such as tetramethoxy titanium, tetraethoxy titanium, trimethoxy aluminum, triethoxy aluminum, tetramethoxy hafnium, or tetraethoxy hafnium. Specifically, the formation is performed in the same manner as the insulator coating film of the polyorganosiloxane compound described above.

In order to form the above-mentioned polyorganosiloxane compound as the insulator coating film by a plasma CVD method, for example, the following method can be adopted. A mixture of a liquid organosilane and a rare gas such as Ar (argon) or He (helium), and the soft magnetic powder are introduced into a chamber equipped with an electrode and a stirrer. Subsequently, while stirring the soft magnetic powder, a power of 0.25 $W/cm^2$ or more is applied to the electrode, and the polyorganosiloxane compound is deposited at the surface of the soft magnetic powder.

In order to form the above-mentioned polyorganosiloxane compound as the insulator coating film by a coating method, for example, the following method can be adopted. The soft magnetic powder is placed in a container equipped with a stirrer, and while stirring, thermosetting polysilsesquioxane is fed to the container and applied to the surface of the soft magnetic powder. Subsequently, a heating treatment is performed, whereby the insulator coating film is formed. Then, the process proceeds to Step S2.

In Step S2, vibration is applied to the soft magnetic powder coated with the insulator. By this application of vibration, the aggregated soft magnetic powder is deflocculated, and also each particle of the soft magnetic powder is allowed to rotate. This rotation enables each powder particle to change the direction relative to the energy source when Step S2 and the below-mentioned Step S3 of applying energy to the soft magnetic powder are simultaneously performed. According to this, energy is applied to the surface of each powder particle while suppressing bias, and the below-mentioned formation of a dangling bond in the insulator can be promoted.

A method for applying vibration is not particularly limited as long as the aggregated soft magnetic powder is deflocculated and allowed to rotate. Specifically, a method utilizing an acoustic wave, an ultrasonic wave, a rotor, air flow, or the like is exemplified.

For example, in a method utilizing an acoustic wave, a woofer or the like is used, and in a method utilizing an ultrasonic wave, an ultrasonic oscillator or the like is used. In a method utilizing a rotor, an eccentric motor, a stirring blade, or the like may be used, or a container storing the soft magnetic powder may be allowed to rotationally move. In a method utilizing air flow, a device provided with a spouted bed with a draft tube or the like is used. In such application of vibration, a known powder treatment device or the like may be applied. Further, among these methods, one method may be used alone, or two or more methods may be used in combination. As a combination example, for example, a method in which vibration in the horizontal direction is applied to the soft magnetic powder by a motor, and also vibration in the vertical direction is applied thereto by an acoustic wave from a woofer, or the like is exemplified. Vibration may be applied to the soft magnetic powder before forming the coating film of the insulator in the same manner as in Step S2.

In this embodiment, Step S2 is performed prior to the step of applying energy in the subsequent Step S3 in the latter part. Further, Step S2 may be performed simultaneously with Step S3. In addition, vibration may be applied to the soft magnetic powder before forming the coating film of the insulator in the same manner as in Step S2. Then, the process proceeds to Step S3.

In Step S3, energy is applied to the surface of the soft magnetic powder coated with the insulator. A method for applying energy is not particularly limited as long as a portion of a molecular chain constituting the insulator is cleaved to form a dangling bond. Specific examples thereof include a plasma treatment, an ozone treatment, and an ultraviolet irradiation treatment.

When the insulator is the above-mentioned organic compound, it is preferred that by applying energy, an organic group included as a side chain or a substituent in a molecular structure is detached and decomposed. According to this, in the insulator, at least some organic groups are eliminated to reduce the organic substance. Therefore, it becomes easy to fire and dissipate the organic substance when firing a molded body in Step S6 in the latter part, and the firing temperature can be lowered. In addition, the organic substance is less likely to remain in the powder magnetic core, and therefore, deterioration over time due to heat of the powder magnetic core can be suppressed.

In this embodiment, in the polyorganosiloxane compound used for the insulator, the organic group in a side chain or the like is cleaved by applying energy, whereby a dangling bond occurs. Specifically, among the covalent bonds included in the molecular structure of the polyorganosiloxane compound, a Si—H bond, a Si—C bond, a C—O bond, or the like having a smaller binding energy than a Si—O bond (siloxane bond) is easily cleaved. Therefore, a Si—O structure in which a dangling bond occurs at an O atom side, a structure in which a dangling bond occurs at a Si atom, or the like is formed. That is, the amount of energy to be applied to the soft magnetic powder is determined so as not to cleave a Si—O bond included in the insulator, but to cleave at least some bonds other than a Si—O bond. The organic group that was cleaved may be decomposed by applying energy, or may be converted into carbon dioxide, water, and methyl alcohol or the like and discharged from the system.

In this embodiment, as the application of energy, a method in which the soft magnetic powder is exposed to an ionized gas or ozone gas is used. By a plasma treatment of exposure to an ionized gas or an treatment of exposure to ozone gas, the above-mentioned dangling bond is formed.

In the plasma treatment, as a treatment gas, for example, a rare gas such as Ar (argon), He (helium), or Ne (neon), $N_2$ (nitrogen), $O_2$ (oxygen), air, a gas in which water is added to any of such gases, water alone, and the like are exemplified. In the plasma treatment, an atmospheric pressure plasma or a vacuum plasma is used, and the treatment pressure is preferably set to atmospheric pressure to 1 Pa. According to this, the plasma treatment can be carried out even in high vacuum, however, the amount of an element to be provided for the treatment is small, and therefore, the treatment efficiency decreases. When an atmospheric pressure plasma is used or when moisture is contained in the treatment gas, in addition to the formation of a dangling bond in the insulator, a hydroxy group may be formed from the moisture and the dangling bond.

In the plasma treatment, DC discharge may be used, or AC discharge with a frequency of 2.45 GHz or less may be used. When a high frequency is applied, the soft magnetic powder is induction-heated, and therefore, a remote plasma system including a plasma source outside a treatment chamber is adopted. Further, when the treatment frequency is 10 kHz or less, induction heating in the soft magnetic powder is slight, and therefore, direct discharge in the treatment chamber may be adopted.

In the ozone treatment, the soft magnetic powder is exposed to an atmosphere having an ozone concentration of 5000 ppm or more for 10 minutes or more. Then, the process proceeds to Step S4.

In Step S4, the soft magnetic powder to which energy was applied is exposed to an atmosphere having an atmospheric pressure dew point of −30° C. or higher and 15° C. or lower. The atmospheric pressure dew point to which the soft magnetic powder is exposed is preferably −20° C. or higher and 0° C. or lower. According to this, moisture in the atmosphere acts on the dangling bond formed in the soft magnetic powder, whereby a hydroxy group is formed from the dangling bond and the moisture. The formation of a hydroxy group proceeds more significantly at the surface than inside the insulator. When the atmospheric pressure dew point is within the above range, the formation of a hydroxy group is promoted, and also dew condensation can be prevented. It is not necessary for all dangling bonds formed in the insulator to become a hydroxy group. Then, the process proceeds to Step S5.

In Step S5, a molded body is formed from the soft magnetic powder exposed to the above-mentioned atmosphere. Step S5 is a step of so-called powder compaction. When the soft magnetic powder is molded, between adjacent particles of the soft magnetic powder, hydroxy groups forms a hydrogen bond and dangling bonds form a covalent bond. As for the shape of the molded body, it is formed into a desired shape such as a ring shape, a rod shape, or a cubic shape according to the intended use of the powder magnetic core. Further, a conductive wire in a coil shape or the like may be embedded in the molded body.

The molded body is formed from the soft magnetic powder at a pressing force of 20 MPa or more and 400 MPa or less using a mold according to the shape of the powder magnetic core. A preferred pressing force is 35 MPa or more and 250 MPa or less. Even if the pressing force that is a compressive stress during powder compaction is lowered as compared with the related art in this manner, a hydrogen bond or a covalent bond is formed between adjacent particles of the soft magnetic powder, and the shape of the molded body is maintained. According to this, the occurrence of processing distortion during powder compaction is suppressed.

In this embodiment, a polyorganosiloxane compound is used for the forming material of the insulator, and therefore, a hydrogen bond is formed from silanol groups in the insulator. Further, a siloxane bond (Si—O—Si structure) is formed from a structure in which a dangling bond occurs at a Si atom and a Si—O structure in which a dangling bond occurs at an O atom side. Then, the process proceeds to Step S6.

In Step S6, the molded body is fired at a temperature of 100° C. or higher and 400° C. or lower. The firing temperature of the molded body is preferably 120° C. or higher and 250° C. or lower. The firing time is not particularly limited, but is set to, for example, 0.5 hours or more and 5.0 hours or less. According to this, a siloxane bond is formed by a dehydration condensation reaction of silanol groups in the insulator, whereby adjacent particles of the soft magnetic powder are firmly bound to each other. In addition, an unnecessary organic substance or the like in the molded body is eliminated by firing. Further, since the firing temperature is relatively low, when the soft magnetic powder contains an amorphous phase, crystallization of the amorphous phase is suppressed.

The powder magnetic core of this embodiment is produced through the steps described above. The powder magnetic core of this embodiment is favorably used for a magnetic core such as a toroidal coil, an inductor, a reactor, a transformer, a motor, or a generator, and a magnetic element other than the magnetic core such as an electromagnetic wave absorber.

According to this embodiment, the following effects can be obtained.

The hysteresis loss can be reduced by suppressing the occurrence of processing distortion in the powder magnetic core. More specifically, by applying energy, a portion of a molecular chain constituting the insulator is cleaved, whereby a dangling bond occurs. Then, by exposure to a given atmosphere containing moisture, a hydroxy group is formed from the dangling bond and the moisture. The formation of a hydroxy group occurs more significantly at the surface than inside the insulator that coats the soft magnetic powder. Since hydroxy groups form a hydrogen bond, adjacent particles of the soft magnetic powder are bound to each other through a hydrogen bond. Further, adjacent particles of the soft magnetic powder are bound to each other also through a covalent bond formed by a dehydration condensation reaction of hydroxy groups or a covalent bond formed by dangling bonds. Since these bonds are formed, particles of the soft magnetic powder are bound to each other even by pressing at a lower compressive stress than in the related art, and the shape of the molded body is easily maintained. Accordingly, the compressive stress during power compaction is suppressed low. That is, a method for producing a powder magnetic core capable of suppressing the occurrence of processing distortion so as to reduce the hysteresis loss can be provided.

By firing, a dehydration condensation reaction between hydroxy groups in the soft magnetic powder is promoted. In this embodiment, a siloxane bond is formed by a dehydration condensation reaction between silanol groups. Therefore, adjacent particles of the soft magnetic powder are firmly bound to each other so that the strength of the molded body can be enhanced.

By the application of vibration, the aggregated soft magnetic powder is deflocculated, and therefore, energy is applied to the surface of each particle of the soft magnetic powder while suppressing bias. According to this, cleavage of a molecular chain in the insulator can be promoted.

A molecular chain at the surface of the insulator can be cleaved by an ionized gas or ozone gas. Further, since energy is applied with a gas, the gas can be made to penetrate up to the inside of the clustered soft magnetic powder. According to this, energy is applied from all directions of the surface of the soft magnetic powder, and a molecular chain can be cleaved while suppressing the positional bias at the surface of the soft magnetic powder.

By containing an amorphous phase in the soft magnetic powder as when the soft magnetic powder is an amorphous powder or a hetero-amorphous powder, or the soft magnetic powder is a nanocrystalline powder, the coercive force of the soft magnetic powder is decreased, and the hysteresis loss is reduced. Further, in the method for producing a powder magnetic core in the related art, when an amorphous phase is contained in the soft magnetic powder, crystallization of the amorphous phase occurs due to heating, and the hysteresis loss is likely to increase. In particular, in a heating treatment for fluidizing or firing and dissipating a binder used in powder compaction, there is a tendency that the crystallization is promoted. On the other hand, in this embodiment, the occurrence of processing distortion is suppressed, and also a binder is not used. Therefore, the heating treatment is no longer needed so that crystallization of the amorphous phase is suppressed, and an increase in the hysteresis loss can be suppressed.

2. Second Embodiment

A method for producing a powder magnetic core according to a second embodiment will be described. In the method for producing a powder magnetic core according to this embodiment, application of energy and exposure to a given atmosphere are simultaneously performed with respect to the method for producing a powder magnetic core of the first embodiment. The method is the same as that of the first embodiment except this point, and therefore, a repetitive description of the same configuration as that of the first embodiment will be omitted. In the following description, the accompanying FIGURE is referred to for the sake of convenience.

In the method for producing a powder magnetic core of this embodiment, a step of applying energy and a step of exposing the soft magnetic powder to a given atmosphere are simultaneously performed. That is, in the process flow shown in the accompanying FIGURE, Step S3 and Step S4 are performed in parallel. Specifically, for the soft magnetic powder, any of a plasma treatment, an ozone treatment, and an ultraviolet irradiation treatment exemplified in the first embodiment, or the like is performed in an atmosphere having an atmospheric pressure dew point of −30° C. or higher and 15° C. or lower. In this embodiment, as a method for applying energy, the same method as in the first embodiment is adopted, and also is performed in the above-mentioned atmosphere.

The steps other than those described above are performed in the same manner as the method for producing a powder magnetic core of the first embodiment, whereby a powder magnetic core of this embodiment is produced. According to this embodiment, the following effect can be obtained in addition to the effects of the first embodiment.

Cleavage of a molecular chain and formation of a hydroxy group in the insulator proceed in parallel, and therefore, the formation of a hydroxy group can be promoted. Further, a time required for the production of a powder magnetic core can be reduced.

3. Third Embodiment

A method for producing a powder magnetic core according to a third embodiment will be described. In the method for producing a powder magnetic core according to this embodiment, application of vibration and application of energy are simultaneously performed and also the method for applying energy is made different with respect to the method for producing a powder magnetic core of the first embodiment. The method is the same as that of the first embodiment except these points, and therefore, a repetitive description of the same configuration as that of the first embodiment will be omitted. In the following description, the accompanying FIGURE is referred to for the sake of convenience.

In the method for producing a powder magnetic core of this embodiment, in a step of applying energy, vibration is applied to the soft magnetic powder simultaneously with energy. That is, in the process flow shown in the accompanying FIGURE, Step S2 and Step S3 are performed in parallel. As a method for applying vibration, the above-mentioned method is used.

Specifically, as Step S2, vibration is applied by the above-mentioned method, and at the same time, the soft magnetic powder is irradiated with ultraviolet light as the application of energy in Step S3. Specifically, the soft magnetic powder is irradiated with ultraviolet light using an ultraviolet lamp, an ultraviolet light emitting diode, an excimer lamp, or the like. The atmosphere in which the soft magnetic powder is irradiated with ultraviolet light is, for example, air, oxygen, or nitrogen. The wavelength of the ultraviolet light for irradiation is not particularly limited as long as a dangling bond can be formed in the insulator, but is, for example, 100 nm or more and 360 nm or less. An irradiation time of ultraviolet light is appropriately adjusted according to the type of the forming material of the insulator, the wavelength of the ultraviolet light for irradiation, and the like. The energy to be applied simultaneously with vibration is not limited to ultraviolet light.

The steps other than those described above are performed in the same manner as the method for producing a powder magnetic core of the first embodiment, whereby a powder magnetic core of this embodiment is produced. According to this embodiment, the following effect can be obtained in addition to the effects of the first embodiment.

By simultaneously applying vibration and energy, deflocculation and rotation of the soft magnetic powder and formation of a dangling bond proceed in parallel. That is, energy is applied while suppressing bias at the surface of each particle of the soft magnetic powder. According to this, cleavage of a molecular chain in the insulator can be promoted. In addition, in the ultraviolet irradiation treatment, the device is simple as compared with a plasma treatment or an ozone treatment, and therefore, it is easy to simultaneously perform the ultraviolet irradiation treatment and the application of vibration.

What is claimed is:

1. A method for producing a powder magnetic core, the method comprising:

applying energy to a surface of a soft magnetic powder coated with an insulator, to cleave a portion of a molecular chain in the insulator and form a dangling bond in the insulator, wherein the insulator includes a polyorganosiloxane compound, and the application of the energy includes exposure of the soft magnetic powder to an ionized gas;

exposing the soft magnetic powder to an atmosphere having an atmospheric pressure dew point of −30° C. or higher and 15° C. or lower; and forming a molded body by pressing the soft magnetic powder at 20 MPa or more and 400 MPa or less.

2. The method according to claim 1, wherein the application of the energy and the exposing of the soft magnetic powder are simultaneously performed.

3. The method according to claim 1, further comprising firing the molded body at a temperature of 100° C. or higher and 400° C. or lower.

4. The method according to claim 1, further comprising applying vibration to the soft magnetic powder before the application of the energy.

5. The method according to claim 1, wherein in the application of the energy, vibration is applied to the soft magnetic powder simultaneously with the energy.

6. The method according to claim 1, wherein the soft magnetic powder contains an amorphous phase.

* * * * *